United States Patent
Lin

(12) United States Patent (10) Patent No.: US 6,498,783 B1
(45) Date of Patent: Dec. 24, 2002

(54) TRAFFIC MONITORING SYSTEM AND SERVICE DIFFERENTIATION IN A DYNAMIC CHANNEL ASSIGNMENT SYSTEM FOR TCP/IP DATA TRANSMITTED VIA CABLE TELEVISION CHANNELS

(75) Inventor: Reitseng Lin, Marlboro, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 09/338,038

(22) Filed: Jun. 22, 1999

(51) Int. Cl.[7] .............................................. H04J 1/016
(52) U.S. Cl. ...................................... 370/252; 725/107
(58) Field of Search .............................. 370/252, 253, 370/248, 249, 242; 725/107, 95; 348/192, 180

(56) References Cited

U.S. PATENT DOCUMENTS

| | | | |
|---|---|---|---|
| 4,408,227 A | * 10/1983 | Bradley | 348/192 |
| 5,477,531 A | 12/1995 | Mckee et al. | 370/249 |
| 5,521,907 A | * 5/1996 | Ennis et al. | 370/253 |
| 5,585,842 A | * 12/1996 | Chappell et al. | 348/192 |
| 5,675,732 A | 10/1997 | Majeti et al. | 709/235 |
| 5,878,032 A | * 3/1999 | Mirek et al. | 370/252 |
| 6,278,485 B1 | * 8/2001 | Franchville et al. | 324/76.19 |
| 6,404,738 B1 | * 6/2002 | Reininger et al. | 370/236 |

* cited by examiner

Primary Examiner—Chau Nguyen
Assistant Examiner—Keith M. George
(74) Attorney, Agent, or Firm—John De La Rosa

(57) ABSTRACT

This invention relates to a method for computing the average data transmission rate available in each channel in a data communication, TCP/IP system that utilizes in part cable television channels as the transmission media. The method employs a bandwidth manager and a test personal computer, both of which are connected to the cable channel system to determine the average bit rate through any channel in the system. By utilizing computers connected to the cable system to make bit rate measurements, the problems associated with having a low speed telephone link that dominates the measurement is avoided. The method to measure the bit rate in a channel includes sending a test message of fixed length from the bandwidth manager to the personal computer via a chosen channel with a timestamp and computing the data transmission rate in the chosen channel by dividing the number of bits in the test message by the difference in time between when the test message is received by the personal computer and the timestamp placed on the test message by the bandwidth manager. Average data transmission rates via the chosen channel are computed by averaging multiple measurements of the data transmission rate through the chosen channel. Once the data transmission rates are determined for all channels in the system, different classes of service through different channels can be provided.

17 Claims, 2 Drawing Sheets

TRAFFIC MONITORING SYSTEM AND SERVICE DIFFERENTIATION IN A DYNAMIC CHANNEL ASSIGNMENT SYSTEM FOR TCP/IP DATA TRANSMITTED VIA CABLE TELEVISION CHANNELS

TECHNICAL FIELD

This invention relates to data communication via cable television networks, and, more particularly, to a method for measuring the data transmission rate (i.e., the bit rate) through various channels in such a system and for providing different classes of service based on the data transmission rates in the channels.

BACKGROUND OF THE INVENTION

In data communication networks, it is often necessary to test communications between any two nodes in the network. This can be accomplished by having a first node on the network request a second node on the network to "loop-back" a test packet. In this manner, the first node can now determine that communication with the second node is possible as well as determine the round trip time for the test packet between the two nodes.

Networking protocols, such as the Internet Protocol (IP), also permit the estimation of round trip time by use of a looped-back test packet. In IP networks, the Internet Control Message Protocol (ICMP) permits control and information messages, including echo request and echo reply messages to be passed between different nodes. The ICMP also permits messages incorporating a timestamp request and timestamp reply messages which permit a transit time estimate to be made in both transit directions.

Users may also send ICMP echo requests using a TCP/IP (Transmission Control Protocol/Internet Protocol) utility called "ping" (Packet InterNet Groper) and users may specify the number and size of test packets for which round trip times are returned.

High speed data communication systems are capable of transmitting digital information in the form of packets at data rates of 10 Mbps to any remote location such as a home, school or office using standard cable television channels, systems and components. Such a multi-user, high speed, asymmetric, data communication system employing cable television channels is described in U.S. Pat. No. 5,675,732 (the '732 patent), which is incorporated herein by reference.

In that latter communication system, it is often necessary to view data traffic conditions in each communication channel and take further actions based on the information learned. The TCP/IP utility called "ping" (Packet InterNet Groper), described above, can be used to determine the average bit rate available in each channel in such a TCP/IP system that utilizes cable television channels as the transmission media. However, the "ping" command is no t suitable f or this particular application. This is s o because i n an asymmetric communication system such as the one described in the '732 patent, the low speed telephone line will dominate the computation of the data rate through any channel.

This invention describes a traffic monitoring method to overcome this problem. Under the methods described in this invention, the time needed for a test message to travel the low speed telephone link is eliminated from the computation to measure the average data transmission rate, i.e., bit rate, for a channel.

SUMMARY OF THE INVENTION

The present invention provides a method to compute the average data transmission rate available in each channel in a data communication, TCP/IP system that utilizes in part cable television channels as the transmission media. The method employs a bandwidth manager and a test personal computer, both of which are connected to the cable channel system to determine the average bit rate through any channel in the system. By utilizing computers connected to the cable system to make bit rate measurements, the problems associated with having a low speed telephone link that dominates the measurement is avoided.

The method to measure the bit rate in a channel include s the steps of: providing a bandwidth manager for the data communication system; connecting a test personal computer to the system, the test PC being cap able of communicating with a number of channels in the system; synchronizing time clocks on both the bandwidth manager and the test PC and preferably performing this synchronizing step in light traffic conditions; sending a test message of fixed length from the bandwidth manager to the personal computer via a chosen channel with a timestamp; and computing the data transmission rate in the chosen channel by dividing the number of bits in the test message by the difference in time between when the test message is received by the personal computer and the timestamp placed on the test message by the bandwidth manager.

Average data transmission rates via the chosen channel are computed by averaging multiple measurements of the data transmission rate through the chosen channel. Other channels in the system are then assigned through the bandwidth manager to the personal computer for making measurements of the data transmission rate.

The data transmission rates through the various channels are stored in a database in the bandwidth manager and other computers in the system are permitted to access this database to display the data transmission rates through different channels in the system.

Once the data transmission rates are determined for all channels in the system, different classes of service through different channels (e.g., 256 Kbps service in channel 1 and 64 Kbps service in channel 2) can be provided. In addition, new sessions through a specific class of service may be granted to a user if the measured data transmission rate through the user's channel exceeds the bandwidth allocated to the channel and the number of sessions previously assigned to the user is less than the number of sessions permitted. Finally, users may be switched from higher data transmission rate channels to lower data transmission rate channels or vice versa to better accommodate additional users in the system.

DETAILED DESCRIPTION

Figure 1:
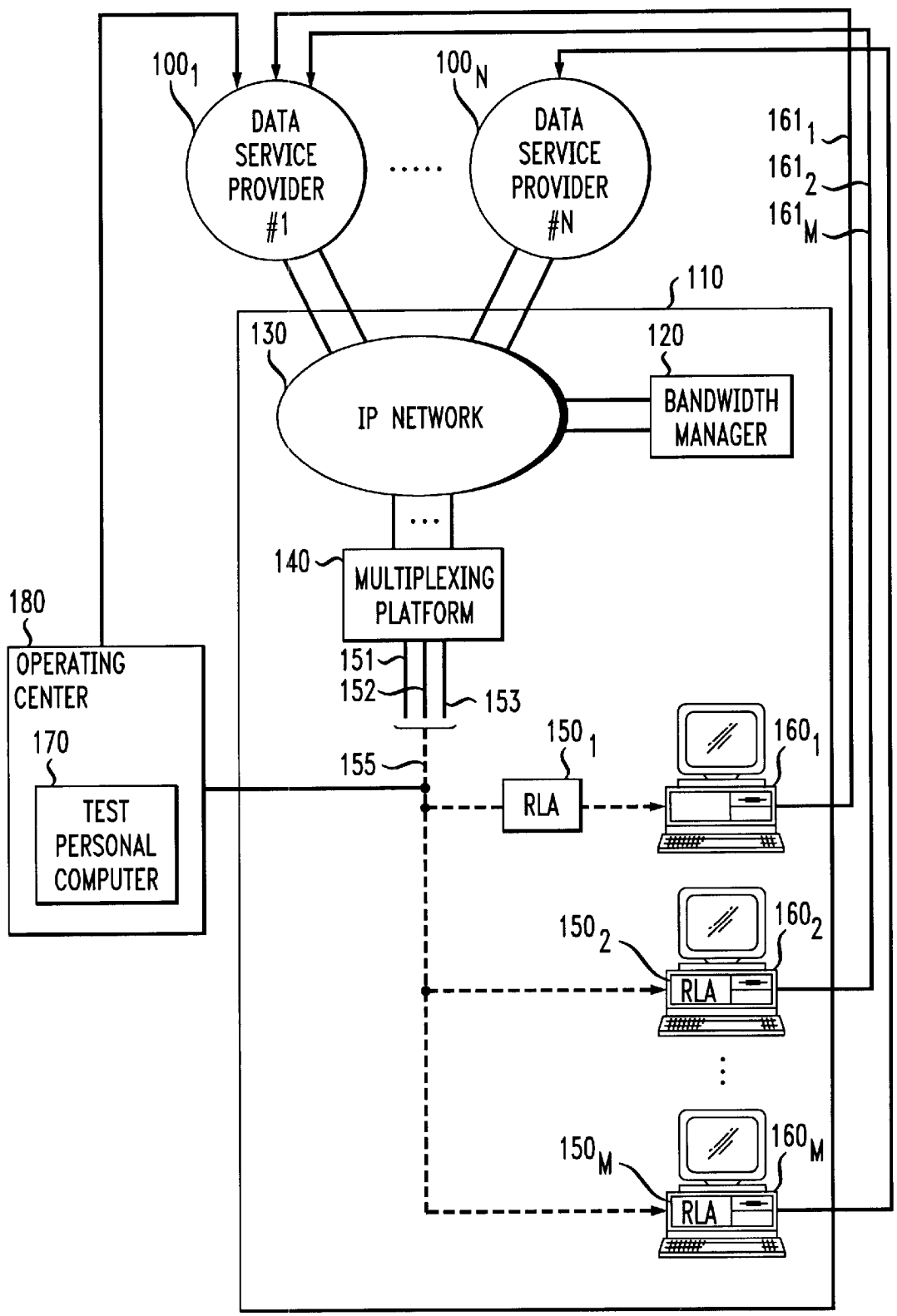
FIG. 1 is a block diagram of the data communication system of the present invention showing the testing apparatus to make the data transmission rate measurements.

Referring to FIG. 1, a data communication system 110 is shown. Communication system 110 connects data service providers $100_1$–$100_N$ to single user data units $160_1$–$160_M$, which are end users. Data service providers $100_1$–$100_N$ may be providing online data services such as text, stock quotes, multimedia, video games, and the like. Data service providers $100_1$–$100_N$, are connected to an internet protocol (IP) network 130 and can send and receive data packets through the network. Also connected to IP network 130 is a multiplexing platform 140. Multiplexing platform 140 receives data packets in internet protocol and multiplexes and modulates them into one of a number of frequency channels.

Multiplexing platform 140 may modulate the data packets received from IP network 130 into one of two or more 6 MHZ wide television compatible channels. The modulation used is compatible with existing television signal equipment, so the modulated data packets are distributed using the same equipment as cable or free space broadcast television signals. Three channels 151, 152, and 153 are shown, but any number greater than two is considered within the scope of the invention. Channels 151, 152, and 153 are transported via a common media 155, such as CATV cable, optical fiber, or even free space. Common media 155 is connected to remote link adapters (RLAs) $150_1$–$150_M$, which may be independent units such as $150_1$, or may be part of another unit. Each RLA $150_1$–$150_M$ demodulates and demultiplexes the data packets on one of the channels 151, 152, or 153 to which it is tuned. Each RLA $150_1$–$150_M$ is channel agile and may be tuned in response to a signal from a head end bandwidth manager 120 to any channel 151, 152, or 153. RLA $150_1$ converts the demodulated data packets into a IEEE 802.2 protocol data packets and forwards the data packets to single user data unit $160_1$, which may be a data terminal, a work station, a personal computer, or some other type of data equipment. RLAs $150_2$–$150_M$ are part of single user data units $160_2$–$160_M$, thus RLAs $150_2$–$150_M$ demodulate and demultiplex data packets on their respective channels and transmit these packets directly to single user data units $160_2$–$160_M$ via respective internal buses. Different RLAs may be dynamically configured to use different amounts of channel bandwidth, e.g., 150 kbps, 300 bps, etc. Once the data packets reach their respective single user data units $160_1$–$160_M$, the data packets may be treated as any other data packet. So, to a large extent, the intermediate stages between data service providers $100_1$–$100_N$ and single user data units $160_1$–$160_M$ are transparent to the data packets.

The distribution of data packets from the data services providers $100_1$–$100_N$ to single user data units $160_1$–$160_M$ through multiplexer platform unit 140 is primarily one way, which means that a second path of some type must exist in order to have some type of control on the packet data, assuming it is not a pure broadcast arrangement, such as commercial television. Each single user data unit $160_1$–$160_M$ also has connections $161_1$–$161_M$ available to any one of the data providers $100_1$–$100_N$ via a narrow bandwidth data line, such as a telephone line or a back channel line of some cable television distribution systems. Single user data units $160_1$–$160_M$ communicate over the narrowband lines using a modem or some other suitable low data rate device. Connections $161_1$–$161_M$ when established are two way data paths, so establishment of a connection and requests for data can be forwarded and acknowledged.

An important part of communication system 110 is bandwidth manager 120. The bandwidth manager 120 is typically a personal computer or a workstation and is connected to data service providers $100_1$–$100_N$ via IP network 130. Bandwidth manager 120 is also connected to multiplexing platform unit 140 via IP network 130. Bandwidth manager 120 is an important part of managing the bandwidth of the connections. Bandwidth manager 120 may be a built-in function of multiplexing platform 140, or remain independent as shown in FIG. 1 in order to manage a distributed architecture with several multiplexing platforms in a given region (not shown in FIG. 1). The role and rationale for bandwidth manager 120 is derived from an assumption that current data service providers will evolve into more multimedia services. If one of data service providers $100_1$–$100_N$ is able to respond to a request from a specific user, the request is forwarded to bandwidth manager 120 requesting bandwidth for high speed distribution to the requesting user. The request may be for data to be delivered at one of a set of rates, e.g., 150 Kbps, 300 Kbps, 1.5 Mbps, etc. The multiplexing platform 140 operates all of the supported channels 151, 152, 153 as part of one sub-network address.

In order to determine how data from data service providers $100_1$–$100_N$ is routed to a channel modulator, bandwidth manager 120 collects traffic and utilization statistics for each channel. Bandwidth manager 120 also receive notifications from the data service providers when a user session terminates so that the assigned bandwidth of that session can be reassigned. Bandwidth manager 120 performs many tasks while also managing the available bandwidth on each of the channels that ultimately deliver the data services. The assignment of a channel at data service request and negotiation time and the release of that channel after the distribution of the requested data is described in the '732 patent and is called dynamic channel assignment. Thus, the apparatus and method for distributing data services from data service providers is described in the '732 patent, and discussed herein for the sake of clarity.

In order to measure the data transmission rates through channels 151, 152 and 153, a test personal computer (PC) 170 is connected to channels 151, 152, and 153 via common media 155. Although the test PC is connected as one of the user units, it is located at operating center 180.

Figure 2:
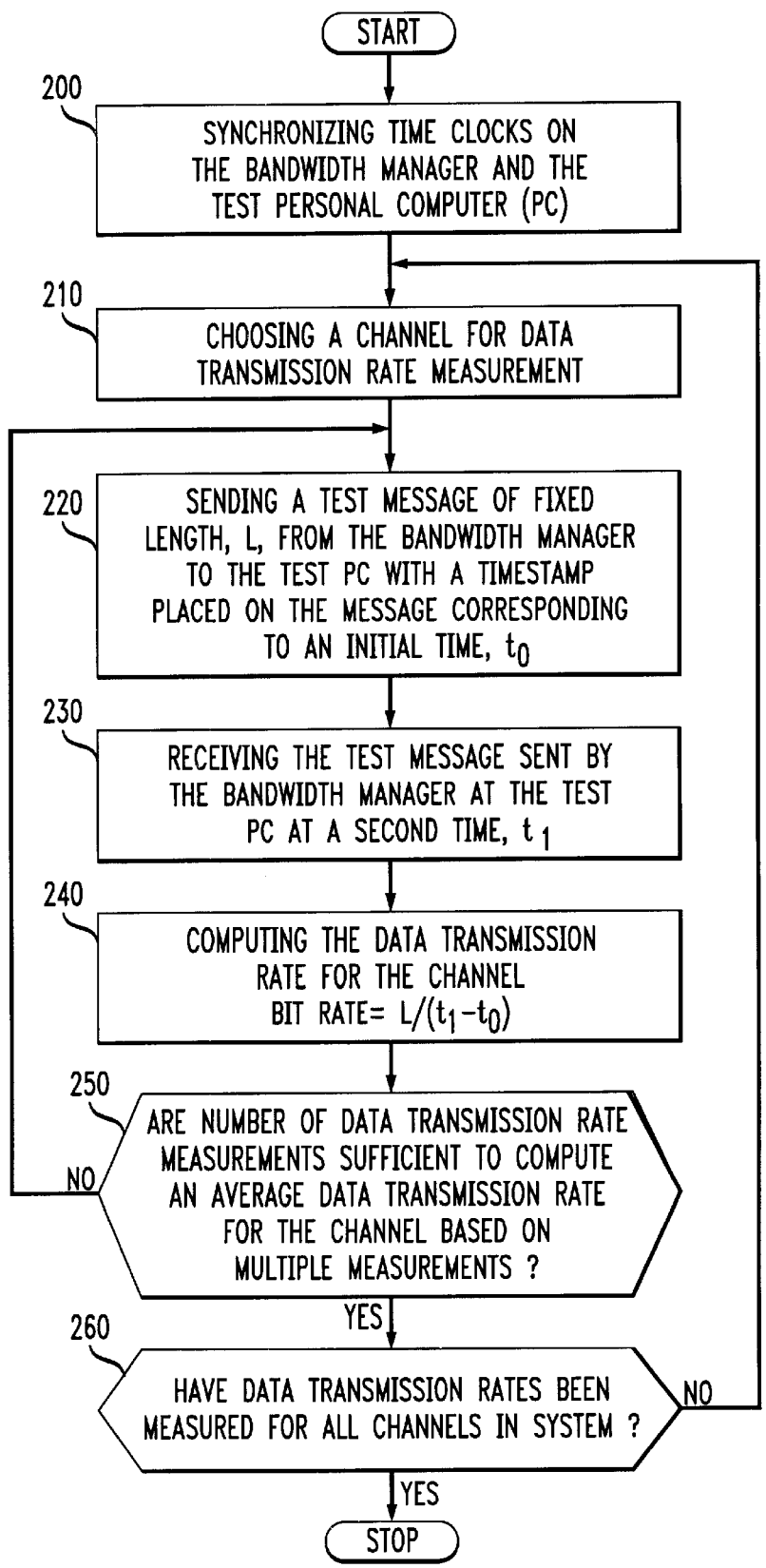
FIG. 2 is a flow chart for measuring the data transmission rates through different channels in the data communication system of FIG. 1.

FIG. 2 shows a flow chart for measuring the data transmission rates through different channels in the data communication system of FIG. 1. During start up, bandwidth manager 120 will attempt to communicate with test PC 170 by sending its clock to PC 170. The test PC will synchronize its clock with the received clock and in the process synchronize itself with bandwidth manager 120, as shown in step 200 in FIG. 2. This synchronization process is preferably performed in light traffic conditions so that bandwidth manager 120 and test PC 170 will be synchronized to the fullest extent possible. In addition, they should resynchronize with each other periodically.

After synchronization is achieved, a specific channel is chosen for the bit rate measurement, as shown in step 210 in FIG. 2. Bandwidth manager 120 then sends a test message of a fixed length, L, bits to test PC 170 with a timestamp placed on the message indicating an initial time, $t_0$, as shown in step 220. Test PC 170 then receives the test message at a second time, $t_1$, as shown in step 230, and computes the estimated data transmission rate for that channel to which it is connected by dividing the total number of bits in the test message by the time difference between $t_1$ and $t_0$, as shown in step 240 in FIG. 2. In other words, the bit rate for that channel is then equal to $L/(t_1-t_0)$. Then, test PC 170 sends the estimated data rate for that channel to bandwidth manager 120 which stores this information in a database. Any computers which can access this database can display the data transmission rate information textually or graphically. These measurements can be repeated multiple times and an average bit rate can be computed in order to obtain a more reliable measure of the bit rate through any channel, as shown in step 250.

Next, bandwidth manager 120 assigns another channel to test PC 170. The procedure for bit rate measurement described above is repeated for the newly assigned channel. New channels are assigned by bandwidth manager 120 to the test PC 170 until the data transmission rates are measured for all channels, as shown in step 260.

Once the approximate data transmission rate through each channel is determined, it is now possible to provide different classes of service in the various channels. In other words, it is now possible to provide channels with differing data throughput, i.e., different bit rates of service. For example, it may be desirable to provide 256 Kbps service in channel 1, 128 Kbps service in channel 2 and 64 Kbps service in channel 3. The approximate data throughput through any channel is maintained by dynamic channel assignment and access control, as described in the '732 patent.

In such a system, users or user units must be granted a session before they can transmit data. A session may be granted if the measured data throughput in a channel is larger than its allocated bandwidth and the number of active sessions is less than the maximum number of sessions that is permitted by the system.

Further, once the traffic monitoring system of the present invention is put in place, system operators can better visualize the traffic conditions of the system. Based on the traffic conditions, the operators may wish to manually transfer some users from one channel to another. If the traffic is very congested, system operators may wish to allocate more channels for use. Thus, by effectively monitoring the average bit rate of each channel in the system, each use can be served with the highest bit rate that is available in the system.

If a channel is overloaded and a session cannot be granted in response to a user's request, the user may be switched to a lower bit rate channel if that channel can satisfy the throughput requirement for the new user. The lower bit rate channel, however, must maintain the higher data throughput until the higher bit rate user is transferred back to the original channel. Along similar lines, a low bit rate user can be assigned to a higher bit rate channel if the low bit rate channel is not available and the higher bit rate channel can accommodate additional users.

Thus, it will now be understood that a new method for measuring data transmission rates through communication channels, such as cable television channels, has been described. While the invention has been particularly illustrated and described with reference to preferred methods, it will be understood by those skilled in the art that various changes in form, details, and applications may be made therein. It is accordingly intended that the appended claims shall cover all such changes in form, details and applications which do not depart from the true spirit and scope of the invention.

What is claimed is:

1. In a data communication system with cable television channels, a method for determining the data transmission rate in a channel comprising:

providing a bandwidth manager for the data communication system;

connecting a personal computer to the system, said computer being capable of communicating with a number of channels in the system;

sending a test message of fixed length from the bandwidth manager to the personal computer via a chosen channel with a timestamp; and computing the data transmission rate in the chosen channel by dividing the number of bits in the test message by the difference in time between when the test message is received by the personal computer and the timestamp placed on the test message by the bandwidth manager.

2. The method of claim 1 further comprising assigning another channel through the bandwidth manager to the personal computer for making measurements of the data transmission rate.

3. The method of claim 1 further comprising the initial step of synchronizing time clocks on both the bandwidth manager and the personal computer, said synchronizing step being preferably performed in light traffic conditions.

4. The method of claim 1 further comprising measuring the average data transmission rate via the chosen channel by averaging multiple measurements of the data transmission rate through the chosen channel.

5. The method of claim 1 further comprising storing the data transmission rate through the chosen channel in a database in the bandwidth manager and permitting other computers in the system to access this database to display the data transmission rates through different channels in the system.

6. The method of claim 1 further comprising the step of providing different classes of service through different channels based on their respective data transmission rates.

7. The method of claim 1 further comprising the step of granting a new session to a user if the measured data transmission rate through the user's channel exceeds the bandwidth allocated to the channel and the total number of active sessions is less than the number of sessions permitted by the system.

8. The method of claim 1 further comprising the step of switching users from higher data transmission rate channels to lower data transmission rate channels or vice versa to better accommodate additional users.

9. In a data communication system with cable television channels, a method for determining the data transmission rate through multiple channels comprising:

(a) providing a bandwidth manager for the data communication system;

(b) connecting a personal computer to the system, said computer being capable of communicating with a number of channels in the system;

(c) synchronizing time clocks on both the bandwidth manager and the personal computer;

(d) sending a test message of fixed length from the bandwidth manager to the personal computer via a chosen channel with a timestamp;

(e) computing the data transmission rate in the chosen channel by dividing the number of bits in the test message by the difference in time between when the test message is received by the personal computer and the timestamp placed on the test message by the bandwidth manager;

(f) assigning a new channel through the bandwidth manager to the personal computer in order to measure the data transmission rate through the new channel; and (g) repeating steps (d) through (f) until data transmission rate measurements are completed for all channels.

10. The method of claim 9 further comprising measuring the average data transmission rate via the chosen channel by averaging multiple measurements of the data transmission rate through the chosen channel.

11. The method of claim 9 further comprising storing the data transmission rate through the chosen channel in a database in the bandwidth manager and permitting other computers in the system to access this database to display the data transmission rates through different channels in the system.

12. The method of claim 9 further comprising the step of providing different classes of service through different channels based on their respective data transmission rates.

13. The method of claim 9 further comprising the step of granting a new session to a user if the measured data transmission rate through the user's channel exceeds the bandwidth allocated to the channel and the total number of active sessions is less than the number of sessions permitted by the system.

14. The method of claim 9 further comprising the step of switching users from higher data transmission rate channels to lower data transmission rate channels or vice versa to better accommodate additional users.

15. In a data communication system with cable television channels, a method for determining the data transmission rate through multiple channels and providing different classes of service through the multiple channels comprising:

(a) providing a bandwidth manager for the data communication system;

(b) connecting a personal computer to the system, said computer being capable of communicating with a number of channels in the system;

(c) synchronizing time clocks on both the bandwidth manager and the personal computer;

(d) sending a test message of fixed length from the bandwidth manager to the personal computer via a chosen channel with a timestamp;

(e) computing the data transmission rate in the chosen channel by dividing the number of bits in the test message by the difference in time between when the test message is received by the personal computer and the timestamp in the test message;

(f) assigning a new channel through the bandwidth manager to the personal computer in order to measure the data transmission rate through the new channel;

(g) repeating steps (d) through (f) until data transmission rate measurements are completed for all channels; and (h) providing different classes of service through different channels based on their respective data transmission rates.

16. The method of claim 15 further comprising the step of granting a new session to a user if the measured data transmission rate through the user's channel exceeds the bandwidth allocated to the channel and the total number of active sessions is less than the number of sessions permitted by the system.

17. The method of claim 15 further comprising the step of switching users from higher data transmission rate channels to lower data transmission rate channels or vice versa to better accommodate additional users.

* * * * *